United States Patent
Chang et al.

[11] Patent Number: 6,163,554
[45] Date of Patent: Dec. 19, 2000

[54] OPTICAL FIBER RAMAN LASER

[75] Inventors: Do IL Chang; Ho Young Kim; El Hang Lee, all of Daejeon, Rep. of Korea

[73] Assignee: Electronics and Telecommunications Research Institute, Daejon, Rep. of Korea

[21] Appl. No.: 09/162,568

[22] Filed: Sep. 29, 1998

[30] Foreign Application Priority Data

May 26, 1998 [KR] Rep. of Korea ..................... 98-19072

[51] Int. Cl.⁷ ..................................................... H01S 3/067
[52] U.S. Cl. ........................................... 372/6; 372/3
[58] Field of Search ............................................. 372/6, 3

[56] References Cited

U.S. PATENT DOCUMENTS

| | | | |
|---|---|---|---|
| 4,794,598 | 12/1988 | Desurvire et al. | 372/3 |
| 5,323,404 | 6/1994 | Grabb | 372/6 |
| 5,815,518 | 9/1998 | Reed et al. | 372/6 |

OTHER PUBLICATIONS

Jean–Luc et al., Fiber Gratings in Lasers and Amplifiers, Journal of Lightwave Technology, vol 15, No. 8, Aug. 1997, pp. 1378–1390.

S.V. Chernikov, et al., High–power, compact, high–efficiency, fiber laser source around 1.24 $\mu$m for pumping Raman Amplifiers, OFC '97 Technical Digest, pp. 345 (No month).

Primary Examiner—James W. Davie
Attorney, Agent, or Firm—Cohen, Pontani, Lieberman & Pavane

[57] ABSTRACT

An optical fiber Raman laser includes an optical fiber which is a nonlinear optical medium, for implementing a nonlinear Stokes frequency shift; a wavelength-division multiplexing optical fiber coupler means, coupled to said optical fiber in parallel, for separating each Stokes frequency shifted wavelengths and pump wavelength, for internally resonating the Stokes frequency shited light wavelengths and for output-coupling said laser output light which is a second order Stokes frequency shifted wavelength; a first fiber Bragg grating means connected to said wavelength division multiplexing (WDM) optical fiber coupler means in serial, for transmitting light of the pump source and for selecting output wave of the Raman laser; and a second fiber Bragg grating means connected to said wavelength division multiplexing (WDM) optical fiber coupler means, which has maximum reflectivity on the wavelength of the pump source, for full-reflecting and re-inputting the light of the pump source to said optical fiber.

5 Claims, 5 Drawing Sheets

OPTICAL FIBER RAMAN LASER

FIELD OF THE INVENTION

The present invention relates to an optical fiber Raman laser; and, more particularly, to an improved optical fiber Raman laser, for use in a high-capacity and long-distance optical communication, which is capable of providing a pump light source of an optical amplifier having 1.5 $\mu$m and 1.3 $\mu$m wavelength and a laser light source generating a light having a variable wave length and a narrow line definition.

DESCRIPTION OF THE PRIOR ART

Generally, a light having 1.5 $\mu$m and 1.3 $\mu$m wavelengths is used in an optical communication system and various studies have been addressed to develop an optical amplifier for used in a long-distance optical communication at each wavelength.

Especially, an erbium-doped fiber amplifier(EDFA) has been preferably employed at 1.5 $\mu$m wavelength. Since an optical signal having 1.5 $\mu$m wavelength can be effectively amplified in a silica optical fiber by using the Raman scattering effect of a light having 1480 nm wavelength which is one of pumping wavelengths for used in the operation of the EDFA, the 1480 nm wavelength light can provide an advantage in that it can be employed as both of a pumping source for the EDFA and a pumping source for a Raman amplifier configured by using a silica optical fiber. As a result, various efforts have been given in a research for developing the light having 1480 nm wavelength as a remote pumping source for EDFA in a silica optical fiber communication system. Nonetheless, no improved remote pumping source has been obtained at 1480 nm wavelength.

On the other hand, at 1.3 $\mu$m wavelength, in order to amplify an optical signal having 1.3 $\mu$m wavelength, it is necessarily needed to use a high power pumping source having 1.24 $\mu$m wavelength. Up to date, no such a pumping source has been developed.

Referring to FIG. 1, there is shown a conventional optical fiber Raman laser employing a selective reflection effect of a fiber Bragg grating. The conventional optical fiber Raman laser includes an optical fiber 13 for inducing a nonlinear Stokes frequency shift, and a plurality of fiber Bragg gratings 11, 12, 14, 15 and 16 which are arranged in both ends of the optical fiber 13.

The optical fiber Bragg grating 11 receives a pumped light from a pumping optical source 100 and has a high transmittivity and the maximum reflectivity at an output wavelength of a Raman laser. The fiber Bragg gratings 12 and 14 adjacent to the optical fiber 13 have the maximum reflectivity at a first order Stokes frequency shifted wavelength and serve as an intracavity for the first order Stokes frequency shifted wavelength. The fiber Bragg grating 15 has a relatively low reflectivity at the Raman laser output wavelength corresponding to a second order Stokes frequency shift. In this case, the fiber Bragg gratings 11 and 15 function as a resonator mirror and an output mirror for the second order frequency shifted wave. The fiber Bragg grating 16 coupled to the output end thereof has a high transmittivity and the maximum reflectivity at the pumped light wavelength.

In the above conventional optical fiber Raman laser employing a selective reflection effect of a fiber Bragg grating, there are some disadvantages that a lot of optical components are needed therein and, at variation of a wavelength, more than one fiber Bragg gratings should be simultaneously adjusted. That is, as a Stokes order is increased, 2 number of fiber Bragg gratings corresponding to each Stokes order should be additionally provided. Consequently, since, in a Raman laser for generating a fourth order Stokes frequency shifted wave, 4 number of fiber Bragg gratings are additionally required therein, it is difficult to implement a cost effective system.

Referring to FIG. 2, there is shown a conventional optical fiber Raman laser using a wavelength division multiplexing (WDM) optical fiber coupler, wherein a third order Stokes frequency shifted wavelength is used as an output wavelength of the Raman laser. The conventional optical fiber Raman laser includes a first WDM optical coupler 21 for separating a pumped light wavelength and a Raman laser output wavelength; a second WDM optical coupler 22 which serves as an intracavity for first and second order Stokes frequency shifted wavelengths; an optical fiber 23 for implementing a nonlinear Stokes frequency shift; and a mirror 24 having the maximum reflectivity for a pumped light and the first, the second, and the third order Stokes frequency shifted wavelengths.

In this case, the band width is adjusted by the second WDM optical coupler 22 to thereby simultaneously resonate lights having the first and second order Stokes frequency shifted wavelengths and resonate a portion of a light having the third order Stokes frequency shifted wavelength. The mirror 24 can be obtained by using a dielectric reflection coating or a periodic characteristic of the second WDM optical coupler 22.

In the conventional optical fiber Raman laser using a wavelength division multiplexing (WDM) optical fiber coupler, it is difficult to obtain a good efficiency because an output laser signal passes through the first WDM optical coupler having a wide line width of transmittivity so that an accurate wavelength selection cannot be obtained. Furthermore, it is also difficult to obtain a variation of a wavelength.

SUMMARY OF THE INVENTION

It is, therefore, an object of the invention to provide an improved optical fiber Raman laser, for use in a high-capacity and long-distance optical communication, which is capable of providing a pump light source of an optical amplifier having 1.5 $\mu$m and 1.3 $\mu$m wavelength and a laser light source generating a light having a variable wave length and a narrow line definition in an effective manner.

In accordance with one embodiment of the present invention, there is an optical fiber Raman laser comprising: an optical fiber which is a nonlinear optical medium, for implementing a nonlinear Stokes frequency shift; a wavelength-division multiplexing optical fiber coupler means, coupled to said optical fiber in parallel, for separating each Stokes frequency shifted wavelengths and pump wavelength, for internally resonating the Stokes frequency shited light wavelengths and for output-coupling said laser output light which is a second order Stokes frequency shifted wavelength; a first fiber Bragg grating means connected to said wavelength division multiplexing (WDM) optical fiber coupler means in serial, for transmitting light of the pump source and for selecting output wave of the Raman laser; and a second fiber Bragg grating means connected to said wavelength division multiplexing (WDM) optical fiber coupler means, which has maximum reflectivity on the wavelength of the pump source, for full-reflecting and re-inputting the light of the pump source to said optical fiber.

In accordance with another embodiment of the present invention, there is an optical fiber Raman laser comprising:

an optical fiber which is a non-linear optical medium, for causing a first order Stokes frequency shift by means of Raman scattering effect for a pump source; a first fiber Bragg grating means for full-reflecting Stokes frequency shifted light from said optical fiber and for transmitting pumped light from the pump source; a wavelength division multiplexing (WDM) optical fiber coupling means connected to said first fiber Bragg grating means in serial and to said optical fiber in parallel, for resonating a first order Stokes frequency shifted light in said optical fiber, thereby inducing and output-coupling a second order Stokes frequency shifted wave; and a second fiber Bragg grating means connected to said WDM optical fiber coupling means, for full-reflecting wavelength of the pump source passing through said optical fiber and for transmitting and output-coupling the light which is the second order Stokes frequency shifted in said WDM optical fiber coupling means.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
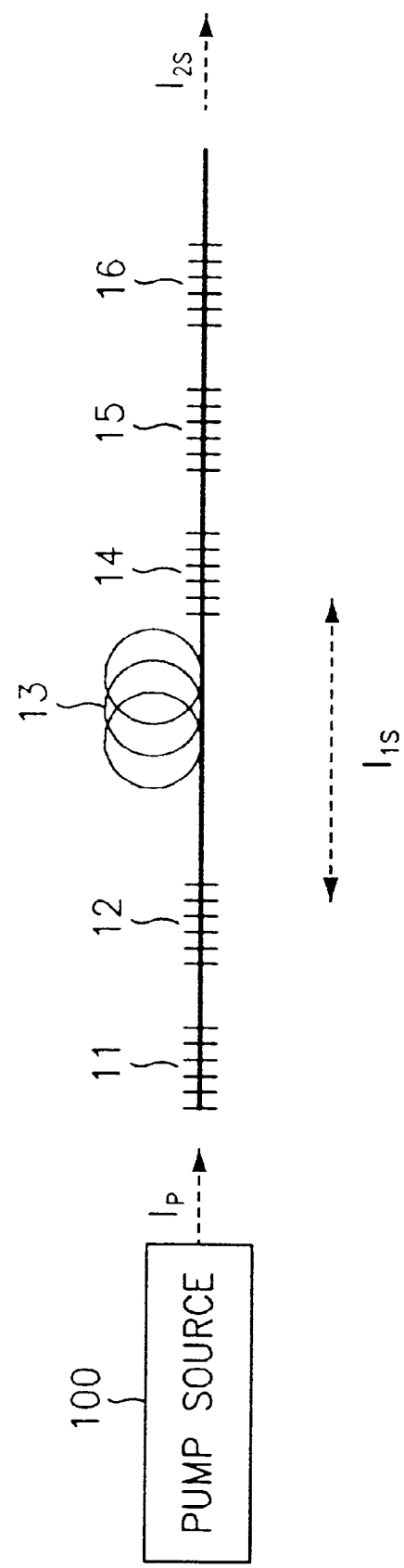
FIG. 1 shows a schematic diagram of a conventional optical fiber Raman laser employing a selective reflection effect of a fiber Bragg grating.
Figure 2:
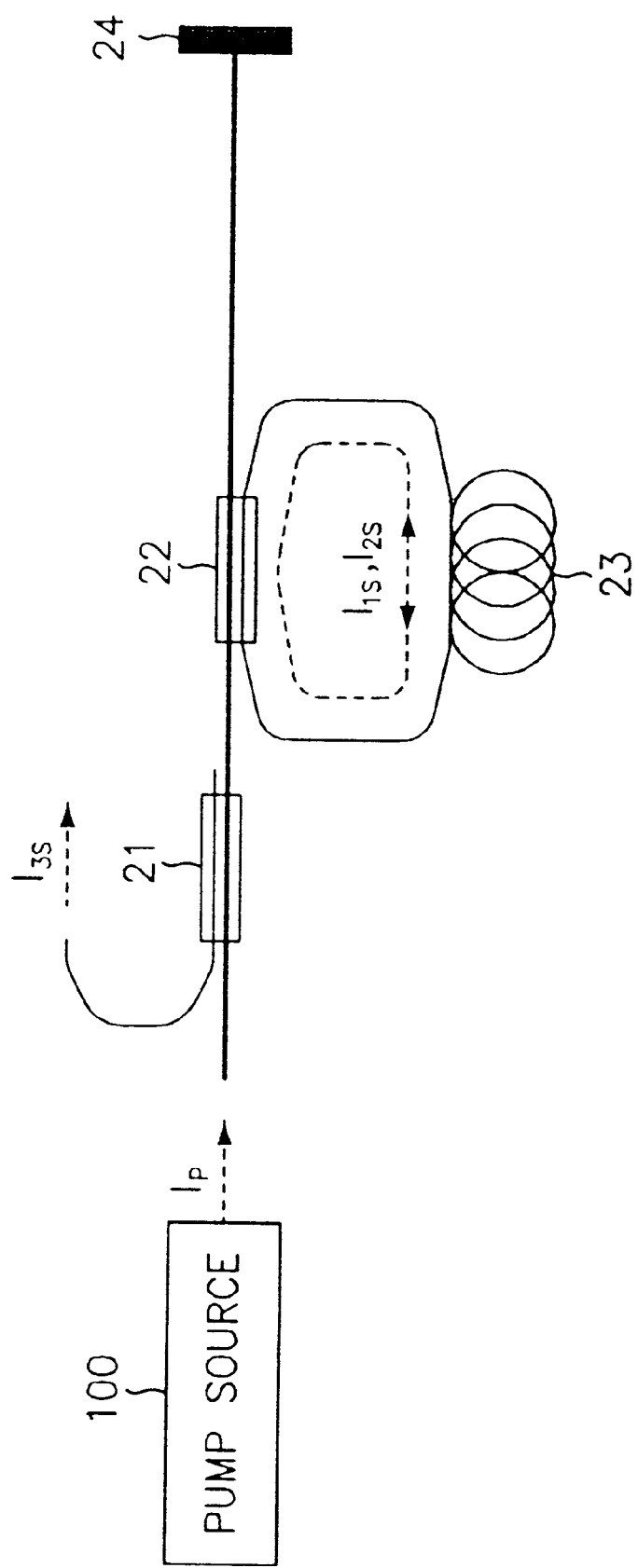
FIG. 2 discloses a schematic diagram of a conventional optical fiber Raman laser using a wavelength division multiplexing (WDM) optical fiber coupler.
Figure 3:
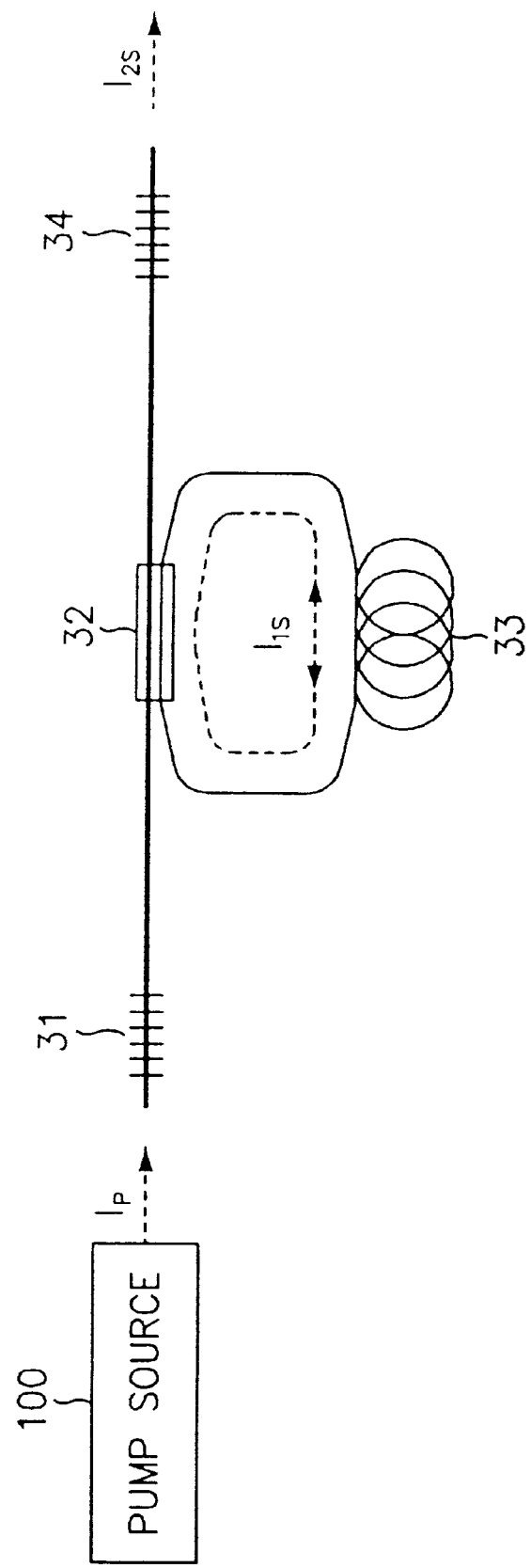
FIG. 3 describes a diagram of an optical fiber Raman laser for generating a second order Stokes frequency shifted light in accordance with an embodiment of the present invention.

Referring to FIG. 3, there is shown an optical fiber Raman laser for generating a second order Stokes frequency shifted light. The optical fiber Raman laser includes an optical fiber 33 which is a nonlinear optical medium and implement a nonlinear Stokes frequency shift by using a Raman scattering effect for a pump source; a first fiber Bragg grating 31 for full-reflecting a second order Stokes frequency shifted light and for passing a pumped light outputted from the pump source; a wavelength division multiplexing(WDM) optical fiber coupler 32, connected to the first fiber Bragg grating 31 in a serial fashion and to the optical fiber 33 in a parallel fashion, for resonating a first order Stokes frequency shifted light at the optical fiber 33 and for inducing the second order Stokes frequency shifted light to thereby generate the second order Stokes frequency shifted light; and a second optical fiber Bragg grating 34, connected to the WDM optical fiber coupler 32 in a serial fashion, for full-reflecting the pumped light from the optical fiber 33 and for passing the second order Stokes frequency shifted light from the WDM optical fiber coupler 32.

Pumped lights Ip generated from the pump source 100 are passed through the first fiber Bragg grating 31 and are then fed to the optical fiber 33 having a Raman active medium by using the WDM optical coupling. Lights of the pumped lights passing through the optical fiber 33 are again relayed to the optical fiber through the WDM optical fiber coupler by the second fiber Bragg grating 21 having the maximum reflectivity at the pump wavelength.

The pumped lights passing through the first fiber Bragg grating 31 and the pump lights full-reflected from the second fiber Bragg grating 34 are cross-passed through the optical fiber 33 so that first order Stokes frequency shifted lights are oscillated in both directions of the optical fiber 33. On the other hand, since a coupling ratio of WDM optical fiber coupler to the lights $I_{1s}$ having first order Stokes frequency shifted wave length is very low, the lights $I_{1s}$ are resonated in an intracavity implemented by the WDM optical fiber coupler 32 to generate a second order Stokes frequency shifted light $I_{2s}$. In this case, if a coupling ratio of WDM optical fiber coupler to the lights $I_{2s}$ having second order Stokes frequency shifted wave length is a value in the range between 0% and 100%, some of the lights $I_{2s}$ are resonated and the remains are passed out through the intracavity implemented by the WDM optical fiber coupler 32.

The lights traveling toward the pump source 100 are reflected by the first Bragg grating 31 and some of the light are then fed back to the optical fiber 33 in which the returned lights are amplified. In this case, the lights having the maximum value of reflectivity to the first fiber Bragg grating 32 are strongly amplified and therefore are selected as an output wavelength of the laser.

Figure 4:
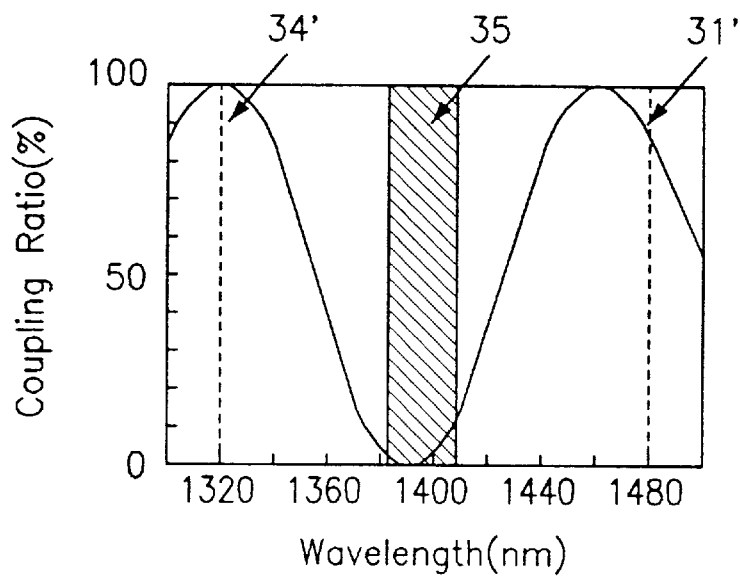
FIG. 4 illustrates a graph showing a relationship between the wavelength and the coupling ratio of a wavelength division multiplexing (WDM) optical fiber coupler in accordance with one embodiment of the present invention.

Referring to FIG. 4, there is shown a relationship between the wavelength and the coupling ratio of a wavelength division multiplexing (WDM) optical fiber coupler in accordance with one embodiment of the present invention. In this case, for example, the Raman laser oscillates lights having 1480 nm wavelength by using Nd:YAG pump laser having 1319 nm wavelength.

As shown, the WDM optical fiber coupler made by using a fiber fusion technique has a sinusoidal characteristic and the wave length of the pump lights is designated by a phantom line 34'. The pump lights are fed to the optical fiber in which the first order Stokes frequency shifted lights are induced by the Raman effect. Since, in a silica optical fiber, the Raman gain is presented in the wide range of frequency, the wavelength can be obtained in an area 35 represented by using slant lines.

Generally, when pump lights having 1319 nm wavelength, the laser is designed to represent a low coupling ratio for a wavelength having a high gain. Therefore, the wavelength of the first order Stokes frequency shifted light is obtained around 1390 nm which represents that the coupling ratio of the WDM optical fiber coupler is 0%. 31' represents a point in which the reflectivity of the first fiber Bragg grating 31 becomes the maximum value.

As can be seen from the above, since the second order Stokes frequency shifted wavelength is selected at the maximum reflectivity of the fiber Bragg grating, the wavelength of the optical Bragg grating can be selected as, for example, 1480 nm.

In this case, at the selected wavelength, the coupling ratio of the WDM optical fiber coupler should be indicated as a low coupling ratio than 100%. Although, at 1480 nm wave length, the coupling ratio can be selected as 10% in FIG. 4, the optimum condition can be obtained by adjusting the coupling ratio corresponding to the wavelength of the WDM optical fiber coupler.

As may be seen from the above, it is readily appreciated that the Raman laser in accordance with the present invention can be implemented in a simple configuration by employing the WDM optical fiber coupler and the fiber Bragg grating. Furthermore, the variation in the output wavelength can be also easily obtained by stretching or compressing the first fiber Bragg grating 31. Further, at the variation of the wavelength, in order to maintain the reflectivity of the laser output mirror, a fiber Bragg grating having a lower reflectivity than the maximum value in the range of a desired wavelength can be also added therein.

The Raman laser shown in FIG. 3 can be adapted to all of the Raman laser for generating a second Stokes frequency shifted wavelength as well as 1480 nm.

Figure 5:
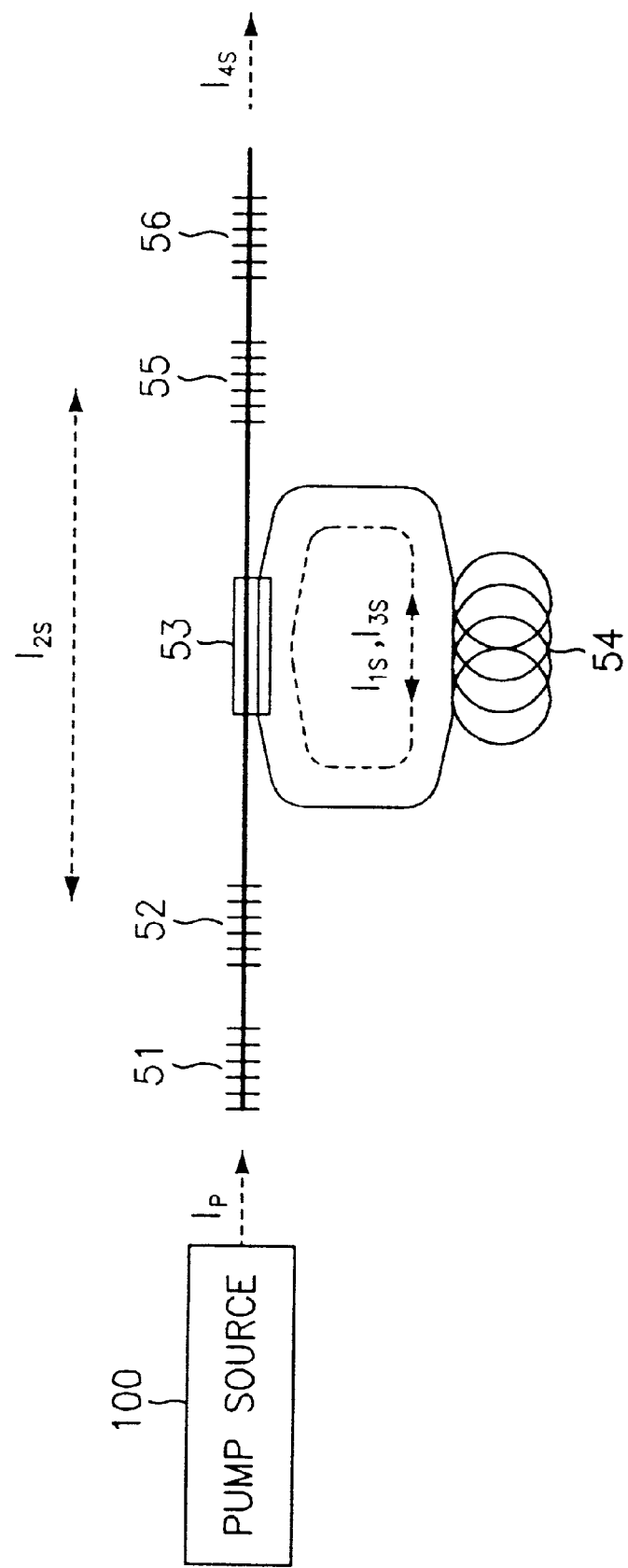
FIG. 5 demonstrates a diagram of an optical fiber Raman laser for generating a fourth order Stokes frequency shifted light in accordance with another embodiment of the present invention.

Referring to FIG. 5, there is shown an optical fiber Raman laser for generating a fourth order Stokes frequency shifted light in accordance with another embodiment of the present invention. The Raman laser includes a first fiber Bragg grating 51 for bypassing lights generated from a pump source 100 and for selectively full-reflecting a laser output wavelength corresponding to a fourth order Stokes frequency shift; second and third fiber Bragg gratings 52 and 55 having the maximum reflectivity for the second Stokes frequency shifted light; a wavelength division multiplexing (WDM) optical fiber coupler 53 which serves as an intracavity for first and third order Stokes frequency shifted wavelength and generates the fourth order frequency shifted wavelength as a laser output; and an optical fiber 54 for inducing a nonlinear Stokes frequency shift; and a fourth fiber Bragg grating 56 for bypassing the Raman laser output, e.g., the fourth order Stokes frequency shifted wavelength and for full-reflecting the pumped light wavelength.

The operation of the Raman laser shown in FIG. 5 is similar to the laser shown in FIG. 3. In order to select the fourth order Stokes frequency shifted wavelength, the second and the third fiber Bragg gratings 52 and 55 resonate the second order Stokes frequency shifted light to thereby generate the third frequency shifted light. The WDM optical fiber 53 internally resonates the first and the third order Stokes frequency shifted wavelength to generate the fourth order Stokes frequency shifted wavelength and then, at the fist fiber Bragg grating 51, the fourth order Stokes frequency shifted wavelength is selected so that selected fourth order Stokes frequency shifted wavelength is outputted through the fourth fiber Bragg grating 56.

Figure 6:
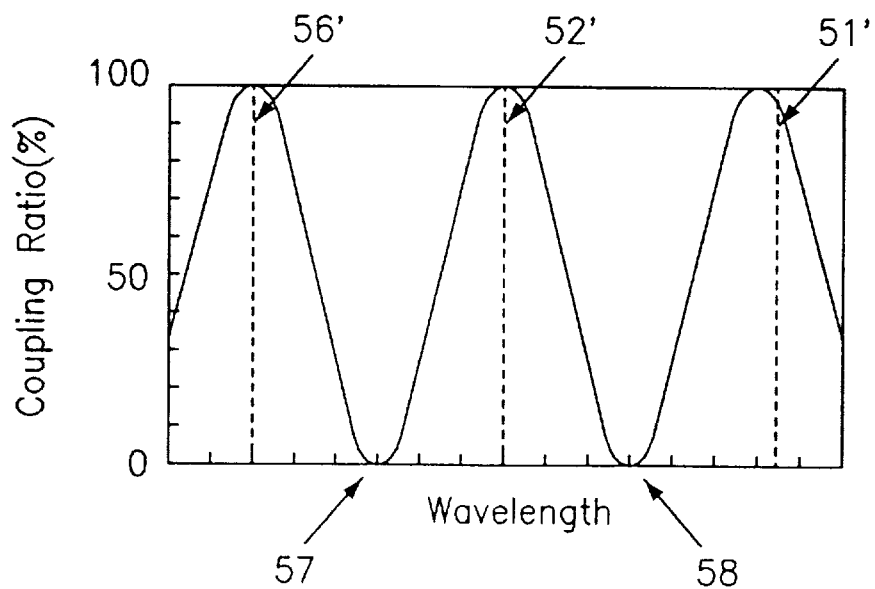
FIG. 6 provides a graph depicting a relationship between the wavelength and the coupling ratio of a wavelength division multiplexing (WDM) optical fiber coupler in accordance with another embodiment of the present invention.

Referring to FIG. 6, there is shown a relationship between the wavelength and the coupling ratio of a wavelength division multiplexing(WDM) optical fiber coupler in accordance with another embodiment of the present invention. As shown, the first and the third order Stokes frequency shifted waves are generated around wavelengths 57 and 58 representing a minimum coupling ratio. The second order Stokes frequency shifted wavelength is selected at the wavelength 52' of the second and the third fiber Bragg gratings 52 and 55 and laser output wavelength is determined at the wavelength 51' of the first fiber Bragg grating 51. In a similar manner shown in FIG. 3, the wavelength variation property of the laser can be enhanced by adding an output mirror, e.g., a fiber Bragg grating therein.

For example, in order to generate a light having a 1.48 $\mu$m wavelength, as shown in FIG. 3, the wavelength of the pump source is 1.3–1.35 $\mu$m. The first fiber Bragg grating 31 bypass the wavelength of the pump source 100 and full-reflects 1.48 $\mu$m wavelength. The second fiber Bragg grating 34 bypasses 1.48 $\mu$m wavelength and full-reflects the wavelength of the pump source 100. The WDM optical fiber coupler 32 serves as the intracavity for 1.37–1.41 $\mu$m wavelength of the first order Stokes frequency shift and serves as the output mirror for 1.48 $\mu$m wave length.

Furthermore, for example, in order to generate a light having a 1.24 $\mu$m wavelength, as shown in FIG. 3, the wavelength of the pump source 100 is 1.10–1.12 $\mu$m. The first fiber Bragg grating 31 bypasses the wavelength of the pump source 100 and full-reflects 1.24 $\mu$m wavelength. The second fiber Bragg grating 34 bypasses 1.24 $\mu$m wavelength and full-reflect the wavelength of the pump source 100. The WDM optical fiber coupler 32 serves as the intracavity for 1.16–1.19 pm wavelength of the first order Stokes frequency shift and serves as the output mirror for 1.24 $\mu$m wavelength.

As can be seen from the above, optical signal having 1.5 $\mu$m wavelength can be amplified by using a pump source having 1.48 $\mu$m wavelength and 1.3 $\mu$m signal wavelength can be amplified by using a pump source having 1.24 $\mu$m wavelength.

In this case, the pump source of the Raman laser in accordance with the present invention can be implemented by using a laser diode pumped double-cladded Yitterbium doped silica fiber laser or laser diode pumped Nd:YAG laser. The Raman active medium can includes a silica fiber and Phosphosilicate fiber.

While the present invention has been shown and described with reference to the particular embodiments, it will be apparent to those skilled in the art that many changes and modifications may be made without departing from the spirit and scope of the invention as defined in the appended claims.

What is claimed is:

1. An optical fiber Raman laser comprising:
   an optical fiber which is a nonlinear optical medium, for implementing a nonlinear Stokes frequency shift;
   wavelength-division multiplexing (WDM) optical fiber coupler means, coupled to said optical fiber in parallel, for separating each Stokes frequency shifted wavelength and a pump wavelength, for internally resonating the Stokes frequency shifted light wavelengths and for output-coupling said laser output light which is a second order Stokes frequency shifted wavelength;
   first fiber Bragg grating means connected to said WDM optical fiber coupler means in serial, for transmitting light of the pump source and for selecting an output wavelength of the Raman laser; and
   second fiber Bragg grating means connected to said WDM optical fiber coupler means, which has maximum reflectivity on the wavelength of the pump source, for full-reflecting and re-inputting the light of the pump source to said optical fiber.

2. An optical fiber Raman laser comprising:
   an optical fiber which is a non-linear optical medium, for causing a first order Stokes frequency shift by means of Raman scattering effect for a pump source;
   first fiber Bragg grating means for full-reflecting Stokes frequency shifted light from said optical fiber and for transmitting pumped light from the pump source;
   wavelength division multiplexing (WDM) optical fiber coupling means connected to said first fiber Bragg grating means in serial and to said optical fiber in parallel, for resonating a first order Stokes frequency shifted light in said optical fiber, thereby inducing and output-coupling a second order Stokes frequency shifted wave; and second fiber Bragg grating means connected to said WDM optical fiber coupling means, for full-reflecting wavelength of the pump source passing through said optical fiber and for transmitting and output-coupling the light which is second order Stokes frequency shifted in said WDM optical fiber coupling means.

3. An optical fiber Raman laser as claimed in claim 2, further comprising:

third fiber grating means coupled between said first fiber Bragg grating means and said WDM optical fiber coupling means, for full-reflecting the second order Stokes frequency shifted light; and fourth fiber Bragg grating means coupled between said second fiber Bragg grating means and said WDM optical fiber coupling means, for full-reflecting the second order Stokes frequency shifted light, wherein fourth order Stokes frequency shifted light is outputted from said WDM optical fiber coupler means.

4. An optical fiber Raman laser as claimed in claim 2, wherein the wavelength of the pump source is between 1.3–1.35 $\mu$m, wherein said first fiber Bragg grating means bypasses the wavelength of the pump source and has the maximum reflectivity at a 1.48 $\mu$m wavelength, wherein said second fiber Bragg grating means bypasses the 1.48 $\mu$m wavelength and has the maximum reflectivity at the wavelength of the pump source, and wherein said WDM optical fiber coupling means serves as an intracavity for 1.37–1.41 $\mu$m wavelength of the Stokes frequency shifted by the wavelength of the pump source, and operates as an output coupler for the 1.48 $\mu$m wavelength, characterized in that said optical fiber Raman laser outputs light having the 1.48 $\mu$m wavelength.

5. An optical fiber Raman laser as claimed in claim 2, wherein the wavelength of the pump source is 1.10–1.12 $\mu$m, wherein said first fiber Bragg grating means bypasses the wavelength of the pump source and has the maximum reflectivity at a 1.24 $\mu$m wavelength, wherein said second fiber Bragg grating means bypasses the 1.24 $\mu$m wavelength and has the maximum reflectivity at the wavelength of the pump source, and wherein said WDM optical fiber coupling means serves as an intracavity for 1.16–1.19 $\mu$m wavelength of the Stokes frequency shifted by the wavelength of the pump source, and operates as an output coupler for the 1.24 $\mu$m wavelength, characterized in that said optical fiber Raman laser outputs light having the 1.24 $\mu$m wavelength.

* * * * *